United States Patent
Li et al.

(10) Patent No.: US 10,207,874 B2
(45) Date of Patent: Feb. 19, 2019

(54) BREAKAGE DETECTION SYSTEM AND METHOD OF CHAINS OF A SCRAPER CONVEYOR

(71) Applicant: CHINA UNIVERSITY OF MINING AND TECHNOLOGY, Jiangsu (CN)

(72) Inventors: Wei Li, Jiangsu (CN); Xing Zhang, Jiangsu (CN); Zhencai Zhu, Jiangsu (CN); Mingquan Qiu, Jiangsu (CN); Yong Ren, Jiangsu (CN); Gongbo Zhou, Jiangsu (CN); Yuxing Peng, Jiangsu (CN); Guohua Cao, Jiangsu (CN)

(73) Assignee: CHINA UNIVERSITY OF MINING AND TECHNOLOGY (CN)

( * ) Notice: Subject to any disclaimer, the term of this patent is extended or adjusted under 35 U.S.C. 154(b) by 9 days.

(21) Appl. No.: 15/525,284

(22) PCT Filed: Dec. 29, 2015

(86) PCT No.: PCT/CN2015/099324
§ 371 (c)(1),
(2) Date: May 8, 2017

(87) PCT Pub. No.: WO2017/036029
PCT Pub. Date: Mar. 9, 2017

(65) Prior Publication Data
US 2018/0186578 A1    Jul. 5, 2018

(30) Foreign Application Priority Data
Sep. 6, 2015   (CN) .......................... 2015 1 0559323

(51) Int. Cl.
*B65G 23/44*   (2006.01)
*B65G 43/06*   (2006.01)
(Continued)

(52) U.S. Cl.
CPC ............. *B65G 43/06* (2013.01); *B65G 23/44* (2013.01); *B65G 43/02* (2013.01); *B65G 43/04* (2013.01); *B66B 25/006* (2013.01)

(58) Field of Classification Search
CPC ........ B65G 43/02; B65G 43/04; B65G 43/06; B65G 23/44
(Continued)

(56) References Cited

U.S. PATENT DOCUMENTS 2,957,132 A * 10/1960 Burkhart, Jr. .......... G01R 35/04
                                                      318/676
5,337,885 A *  8/1994 Mills ..................... B65G 19/10
                                                      198/502.1
(Continued)

FOREIGN PATENT DOCUMENTS

CN          202346366       7/2012    ............. B65G 43/00
CN          202421198       9/2012    ................ G01P 3/00
(Continued)

OTHER PUBLICATIONS

International Search Report and Written Opinion Issued in Corresponding PCT Patent Application Serial No. PCT/CN2015/099324 dated Jun. 14, 2016 English Translation of Search Report (12 Pages).

*Primary Examiner* — William R Harp
(74) *Attorney, Agent, or Firm* — Hayes Soloway P.C.

(57) ABSTRACT

Provided is a breakage detection system and method for a scraper conveyor, wherein a speed measurement device of the detection system and a sprocket assembly of the scraper conveyor are coaxially installed. Encoders are installed on speed measurement gears of the speed measurement device. An output end of the speed measurement device is connected to an input end of a programmable logic controller (PLC). An output end of the PLC is electrically connected to
(Continued)

an automatic alarm device and a digital display module. A power supply module is used for supplying power to the whole system.

3 Claims, 3 Drawing Sheets

(51) Int. Cl.
*B65G 43/02* (2006.01)
*B65G 43/04* (2006.01)
*B66B 25/00* (2006.01)

(58) Field of Classification Search
USPC .............. 198/810.01, 810.02, 810.03, 810.04
See application file for complete search history.

(56) References Cited

U.S. PATENT DOCUMENTS

| | | | |
|---|---|---|---|
| 7,779,994 B1* | 8/2010 | Travis | B65G 43/02 198/810.01 |
| 8,561,785 B2* | 10/2013 | Bugar | B65G 23/00 198/323 |
| 2009/0005196 A1* | 1/2009 | Kessler | A63B 63/00 473/476 |

FOREIGN PATENT DOCUMENTS

| | | | |
|---|---|---|---|
| CN | 202807783 | 3/2013 | ............ B65G 43/02 |
| CN | 202880393 | 4/2013 | ............ B65G 43/02 |
| CN | 104229427 | 12/2014 | ............ B65G 43/06 |
| CN | 104444227 | 3/2015 | ............ B65G 43/06 |
| CN | 105173616 | 12/2015 | ............ B65G 43/06 |

* cited by examiner

BREAKAGE DETECTION SYSTEM AND METHOD OF CHAINS OF A SCRAPER CONVEYOR

FIELD OF THE INVENTION

The present invention relates to a broken chain detection system and method, particularly to a broken chain detection system and method for scraper conveyer.

BACKGROUND ART

At present, scraper conveyers are developed continuously to the trend of heavy-duty, automation, and intellectualization. Transportation safety is always a critical problem that must be solved, owing to limitations such as complex operating conditions and out-of-date detection technique, etc. As one of the major components of implementing a chain sprocket drive system operation, the chain of scraper conveyer may be broken easily owing to material factor, human factor, and uneven load distribution factor, etc., and thereby may result in a chain reaction and have strong impacts on equipment and production safety.

Existing broken chain detection techniques for scraper conveyers, such as detection methods with hall elements and detection methods with pressure sensors, are susceptible to external interferences and have poor feasibility; driving motor current detection method and tension hydraulic cylinder pressure detection method don't support detection methods of partially broken chains, and have poor practicability; travel switch and contactor detection methods may be damaged easily and have poor reliability.

CONTENTS OF THE INVENTION

Object of the invention: In order to overcome the drawbacks in the broken chain detection technique for scraper conveyers in the prior art, the present invention provides a broken chain detection system and method, which is simple, easy to use and maintain.

To achieve the object described above, the present invention employs the following technical solution: A broken chain detection system for scraper conveyer, comprising a speed detector, a digital display module, an automatic warning device, and a PLC controller; the speed detector is mounted coaxially with a chain wheel assembly of a scraper conveyer, encoders are mounted on speed measuring gears of the speed detector, and are hollow shaft photoelectric increment encoders configured to measure the rotation speeds of the speed measuring gears; output end of the speed detector are connected to input end of the PLC controller; output end of the PLC controller are electrically connected to the automatic warning device and the digital display module, and the PLC controller is configured for data processing and program setting, and start/stop control of the scraper conveyer; the digital display module is a hard-wired MAX7219 chip, and is configured to display the rotation speed of the speed detector digitally; the automatic warning device comprises a buzzer and a flashing indicator light, for a broken chain failure pre-warning; a power supply module is provided to supply power to the entire system.

The speed detector comprises a fixed retainer cup, rolling bearings, a spacer ring, and set bolts; fixed retainer cup, spacer ring, speed measuring gear and set bolt; a fixed retainer cup, a spacer ring, speed measuring gear, and set bolts, the fixed retainer cup and the spacer ring are mounted between a rolling bearing and a shaft shoulder and between the rolling bearings respectively, the fixed retainer cup is configured to position the rolling bearings, the rolling bearings and the driving shaft are in clearance fit between them, the spacer ring is fixed by the set bolts and is configured to position the speed measuring gear, and the speed measuring gear can rotate around the driving shaft.

The two encoders are provided, the central axes of the two encoders are in the same horizontal line, and the two encoders are mounted at the outer sides of two speed measuring gears symmetrically.

The speed measuring gears have the same tooth outlines as the chain wheel, and the gear teeth of the gears and the gear teeth of the chain wheel are arranged in the same phase.

A broken chain detection method for scraper conveyer, comprising the following steps:

a) initializing a broken chain detection system, and setting a threshold $M_0$ for critical relative rotation speed difference;

b) measuring speed with encoders: during the operation of a chain drive system after the scraper conveyer is started, when the scraper runs to the chain wheel assembly, a protruding part of the scraper will poke the speed measuring gears and the chain wheel assembly of the scraper conveyer to rotate synchronously, the encoders will rotate along with that rotation and generate count pulses continuously, converting the count pulses to form electrical signals feedback, and transmit the electrical signals to the PLC controller; the PLC controller makes data processes for the electrical signals from the two encoders respectively according to a program setting and thereby obtain rotation speed data of the two speed measuring gears, and obtain a relative rotation speed difference /N/ between the two speed measuring gears through real-time computation;

c) controlling with a PLC program: the PLC controller compares the numerical relationship in real time; if the data values meet $/N/<M_0$ at any time within 5 s, it indicates that the chain of the scraper conveyer operates normally; if $/N/>M_0$ occurs at any time within 5 s, it indicates that the scraper can't normally poke the speed measuring gears and the chain wheel assembly of the scraper conveyer to rotate synchronously; in that case, it is judged that a broken chain failure has happened in the scraper conveyer, and the PLC controller controls the automatic warning device to give off an audible and visible warning, and shuts down the scraper conveyer for checking; moreover, the chain broken can be judged via the digital display module; thus, a broken chain detection cycle for the scraper conveyer is accomplished;

d) repeating the steps b) and c), so as to detect the broken chain condition of the scraper conveyer in real time.

Beneficial effects: In the present invention, a broken chain failure of a scraper conveyer is judged on the basis of a relative rotation speed difference between two speed measuring gears that are in contact with the scraper, warning for broken chain failure and emergency stop control of the scraper conveyer are realized by setting a program with a PLC controller; moreover, the speed measuring gear with a sudden speed change can be judged intuitively via a digital display module, and thereby chain broken can be judged, and the occurrence of a severe safety accident can be avoided. The method is simple, easy to use, has high reliability and high practical value.

DESCRIPTION OF THE DRAWINGS

FIG. 2-1 is a structural diagram of the speed detector according to the present invention;

FIG. 2-2 is a partially enlarged view of the structure shown in FIG. 2-1;

In the figures: 1—driving shaft; 2—chain wheel; 3—encoder; 4—speed detector; 41—fixed retainer cup; 42—rolling bearing; 43—spacer ring; 44—speed measuring gear; 45—set bolt

DETAILED DESCRIPTION OF THE EMBODIMENTS

Hereunder the present invention will be further detailed, with reference to the accompanying drawings.

Figure 2:
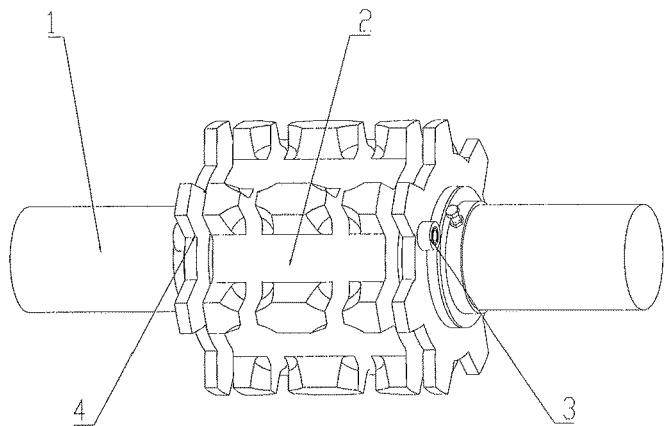
FIG. 2 is a schematic installation diagram of the speed detector according to the present invention.
Figures 1, 2:
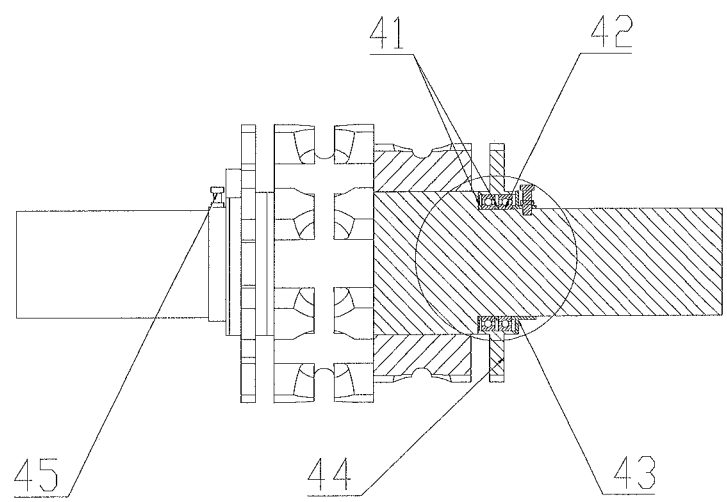
Figure 2:
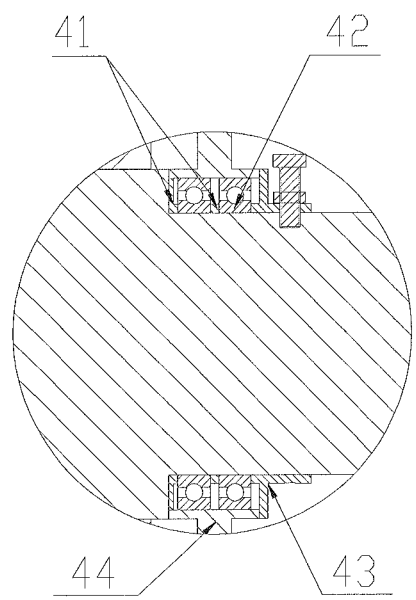

As shown in FIG. 2, a chain wheel 2 and a speed detector 4 are connected on a driving shaft 1; encoders 3 are connected to speed measuring gears 44 of the speed detector 4.

The broken chain detection system for scraper conveyer provided in the present invention comprises a speed detector 4, a digital display module, an automatic warning device, and a PLC controller; the speed detector is mounted coaxially with a chain wheel assembly of a scraper conveyer, encoders 3 are mounted on speed measuring gears 44 of the speed detector 4, and are hollow shaft photoelectric increment encoders configured to measure the rotation speeds of the speed measuring gears 44; output end of the speed detector 4 are connected to input end of the PLC controller; output end of the PLC controller are electrically connected to the automatic warning device and the digital display module, and the PLC controller is configured for data processing and program setting, and start/stop control of the scraper conveyer; the digital display module is a hard-wired MAX7219 chip, and is configured to display the rotation speed of the speed detector digitally; the automatic warning device comprises a buzzer and a flashing indicator light, for broken chain failure pre-warning; a power supply module is provided to supply power to the entire system.

The speed detector comprises a fixed retainer cup 41, rolling bearings 42, a spacer ring 43, speed measuring gears 44, and set bolts 45, wherein, the fixed retainer cup, spacer ring, speed measuring gears and set bolts are configured to position the speed measuring gears, the fixed retainer cup and the spacer ring are mounted between a bearing and a shaft shoulder of the driving shaft 1 and between the bearings respectively for positioning the bearings, the bearings and the driving shaft 1 are in clearance fit between them, the spacer ring is fixed by the set bolts 45 and is configured to position the speed measuring gears 44, and the speed measuring gears 44 can rotate around the driving shaft 1.

Two encoders are provided, the central axes of the two encoders are in the same horizontal line, and the two encoders are mounted at the outer sides of two speed measuring gears symmetrically.

The speed measuring gears 2 are welded to the driving shaft and have the same tooth outlines as the chain wheel, and the gear teeth of the gears and the gear teeth of the chain wheel are arranged in the same phase.

Figure 1:
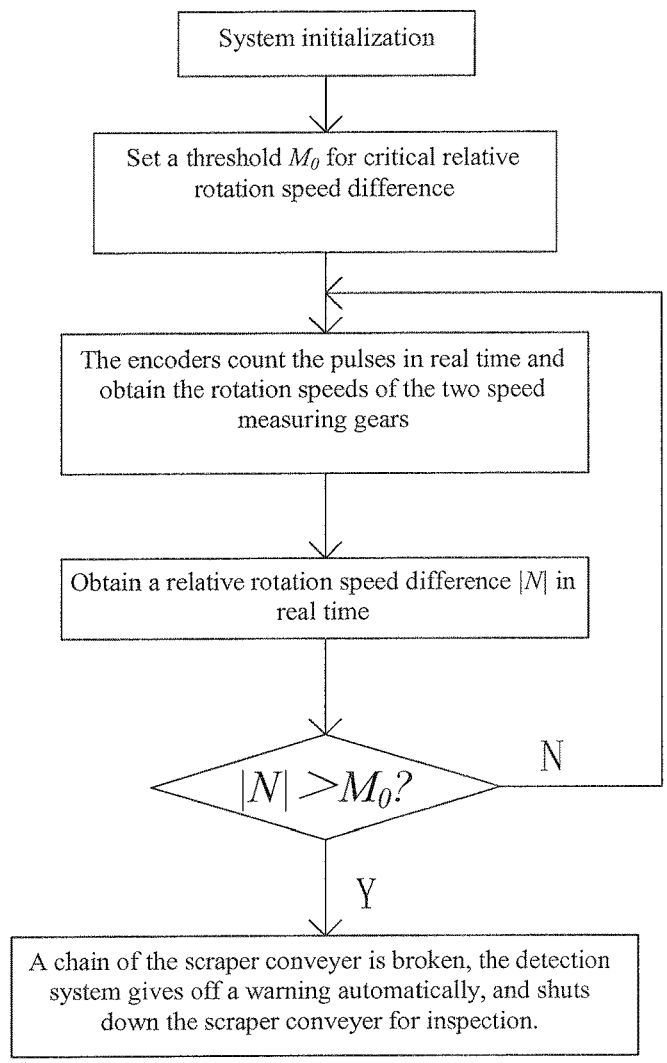
FIG. 1 is a flow diagram of the broken chain detection method according to the present invention.
Figure 3:
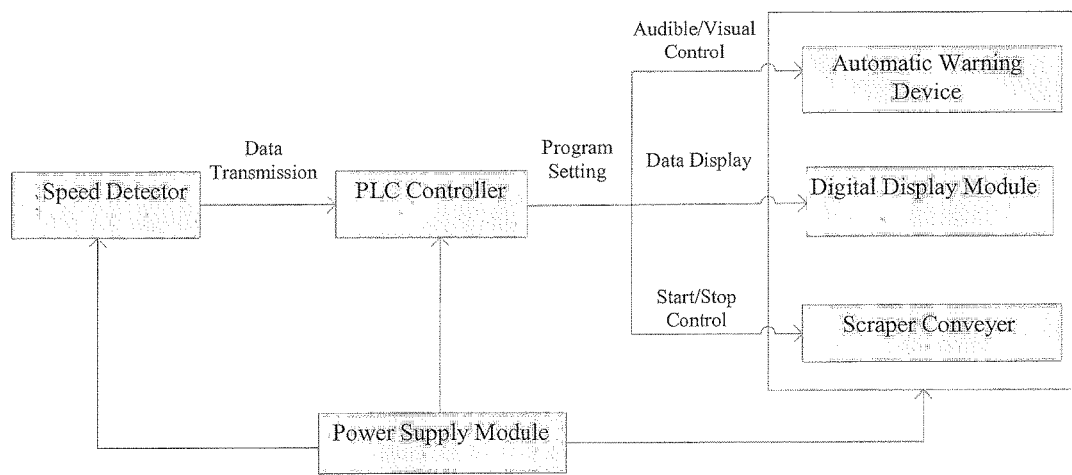
FIG. 3 is a diagram of the entire detection system.

As shown in FIGS. 1, 2, and 3, a broken chain detection method for scraper conveyer, comprising the following steps:

a) initializing the broken chain detection system, and setting a threshold $M_0$ for critical relative rotation speed difference;

b) measuring speed with the encoders: during the operation of a chain drive system after the scraper conveyer is started, when the scraper runs to the chain wheel assembly, a protruding part of the scraper will poke the speed measuring gears and the chain wheel assembly of the scraper conveyer to rotate synchronously, the encoders will rotate along with that rotation and generate count pulses continuously, and converting the count pulses to form electrical signals feedback, and transmit the electrical signals to the PLC controller; the PLC controller makes data processes for the electrical signals from the two encoders respectively according to a program setting and thereby obtain rotation speed data of the two speed measuring gears, and obtain a relative rotation speed difference /N/ between the two speed measuring gears through real-time computation;

c) controlling with a PLC program: the PLC controller compares the numerical relationship in real time; if the data values meet /N/<$M_0$ at any time within 5 s, it indicates that the chain of the scraper conveyer operates normally; if /N/>$M_0$ occurs at any time within 5 s, it indicates that the scraper can't normally poke the speed measuring gears and the chain wheel assembly of the scraper conveyer to rotate synchronously; in that case, it is judged that a broken chain failure has happened in the scraper conveyer, and the PLC controller controls the automatic warning device to give off an audible and visible warning, and shuts down the scraper conveyer for checking; moreover, the chain broken can be judged via the digital display module; thus, a broken chain detection cycle for the scraper conveyer is accomplished;

d) repeating the steps b) and c), so as to detect broken chain condition of the scraper conveyer in real time.

While the present invention has been illustrated and described with reference to some preferred embodiments, the present invention is not limited to these. The person skilled in the art should recognize that various variations and modifications can be made without departing from the spirit and scope of the present invention. All of such variations and modifications shall be deemed as falling into the protected scope of the present invention.

The invention claimed is:

1. A broken chain detection system for a scraper conveyer, comprising
    a speed detector including speed measuring gears, a digital display module, an automatic warning device, and a PLC controller;
    wherein the speed detector is mounted on a drive shaft coaxially with a chain wheel assembly, said speed detector including photoelectric increment encoders mounted adjacent the speed measuring gears of the speed detector, said encoders configured to measure rotation speeds of the speed measuring gears;
    wherein an output of the encoders is connected to an input of the PLC controller;
    wherein an output of the PLC controller is electrically connected to the automatic warning device and the digital display module, and the PLC controller is configured for a start/stop control of the scraper conveyer;
    wherein the digital display module is a hard-wired MAX7219 chip, and is configured to display the rotation speed of the speed detector digitally;
    wherein the automatic warning device comprises a buzzer and a flashing indicator light, for broken chain failure pre-warning; and a power supply module is provided to supply power to the entire system;

wherein, the speed detector further comprises a fixed retainer cup, rolling bearings, a spacer ring, and set bolts, wherein the fixed retainer cup, the spacer ring, the speed measuring gear, and the set bolts are configured to position the speed measuring gears; and wherein the fixed retainer cup and the spacer ring are mounted between a rolling bearing and a shoulder of the driving shaft and between the rolling bearings respectively, the fixed retainer cup is configured to position the rolling bearings, the rolling bearings and the driving shaft have a clearance fit between them, the spacer ring is fixed by the set bolts and is configured to position the speed measuring gears, and the speed measuring gears can rotate around the driving shaft.

2. The broken chain detection system for scraper conveyer according to claim 1, wherein, two encoders are provided, wherein a central axes of the two encoders are in a same horizontal line, and wherein the two encoders are mounted at outer sides of two speed measuring gears symmetrically.

3. A broken chain detection system for scraper conveyer comprising a speed detector including speed measuring gears, a digital display module, an automatic warning device, and a PLC controller;

wherein the speed detector is mounted coaxially with a chain wheel assembly, said speed detector including photoelectric increment encoders mounted adjacent the speed measuring gears of the speed detector, said encoders configured to measure rotation speeds of the speed measuring gears;

wherein an output of the encoders is connected to an input of the PLC controller;

wherein an output of the PLC controller is electrically connected to the automatic warning device and the digital display module, and the PLC controller is configured for a start/stop control of the scraper conveyer;

wherein the digital display module is a hard-wired MAX7219 chip, and is configured to display the rotation speed of the speed detector digitally;

wherein the automatic warning device comprises a buzzer and a flashing indicator light, for broken chain failure pre-warning; and a power supply module is provided to supply power to the entire system; and wherein, the speed measuring gears have a same tooth outline as gears of the chain wheel, and the gear teeth of the speed measuring gears and the gear teeth of the gears of the chain wheel are arranged in a same phase.

* * * * *